United States Patent Office 3,549,615
Patented Dec. 22, 1970

3,549,615
LINCOMYCIN DERIVATIVES AND PROCESS
FOR PRODUCING THE SAME
Robert D. Birkenmeyer, Comstock Township, Kalamazoo, Mich., assignor to The Upjohn Company, Kalamazoo, Mich., a corporation of Delaware
No Drawing. Filed Oct. 17, 1968, Ser. No. 768,527
Int. Cl. C07c 47/18
U.S. Cl. 260—210                                 12 Claims

ABSTRACT OF THE DISCLOSURE

Novel antibacterial compounds of the formula:

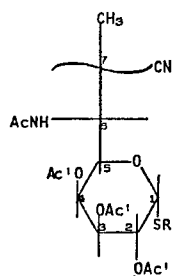

wherein Ac' is hydrogen or a protective group and Ac is carboxyacyl or Ac' are prepared by replacement of the halogen of a compound of the fomula:

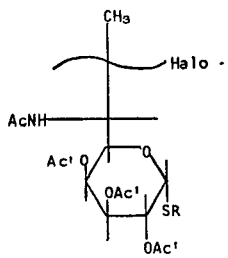

by a cyano group and removing the protective groups.

BRIEF SUMMARY OF THE INVENTION

This invention relates to novel compounds and to processes for preparing them, and is particularly directed to 7-cyano-7-deoxylincomycins, and analogs thereof, to processes whereby they and like compounds are produced and to intermediates formed in these processes.

The novel compounds of the invention can be represented by the following structural formula:

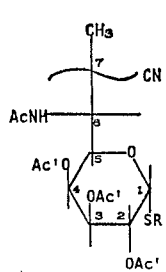

I wherein R is alkyl of not more than 20 carbon atoms, advantageously not more than 8 carbon atoms, cycloalkyl of from 3 to not more than 8 carbon atoms, and aralkyl of not more than 12 carbon atoms, advantageously not more than 8 carbon atoms; Ac' is a protective group; and Ac is hydrogen, Ac', or a carboxyacyl, especially, a 4-substituted-L-2-pyrolidinecarboxylic acid of the formulas:

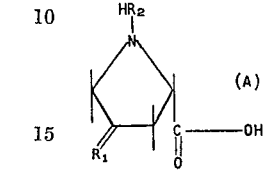 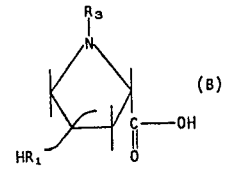

wherein $R_1$ and $R_2$ are alkylidene of not more than 20 carbon atoms (including methylene), advantageously not more than 8 carbon atoms, cycloalkylidene of from 3 to not more than 8 carbon atoms, and aralkylidene of not more than 12 carbon atoms, advantageously not more than 8 carbon atoms; and $R_3$ is hydrogen of $HR_2$. Any or all of the 2-, 3-, and 4-hydroxy groups can be esterified or etherified.

Examples of alkyl of not more than 20 carbon atoms (R, $HR_1$ and $HR_2$) are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof. Examples of cycloalkyl are cyclopropyl, cyclobutyl, cyclopentyl, cyclohexyl, cycloheptyl, cyclooctyl, 2 - methylcyclopentyl, 2,3 - dimethylcyclobutyl, 4-methylcyclobutyl, and 3-cyclopentylpropyl. Examples of aralkyl are benzyl, phenethyl, α-phenylpropyl, and α-naphthylmethyl. Examples of alkylidene, cycloalkylidene, and aralkylidene groups ($R_1$ and $R_2$) include methylene, ethylidene, propylidene, butylidene, pentylidene, hexylidene, heptylidene, octylidene, nonylidene, decylidene, undecylidene, dodecylidene, tridecylidene, tetradecylidene, pentadecylidene, hexadecylidene, heptadecylidene, octadecylidene, nonadecylidene, eicosylidene, and the isomeric forms thereof, cyclopropylidene, cyclobutylidene, cyclopentylidene, cyclohexylidene, cycloheptylidene, cyclooctylidene, 2-cyclopropylethylidene, 3-cyclopentylpropylidene, benzylidene, 2-phenylethylidene, 3-phenylpropylidene, and α-naphthylmethylene.

The novel compounds of the invention, Formula I, as well as other related compounds, can be prepared by replacing by a cyano group the halogen of a compound of the formula:

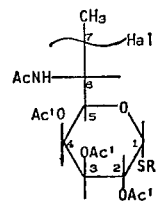

II wherein Ac' is a protective group, for example trimethylsilyl group, which can be removed after the replacement, and Ac is Ac' or a carboxacyl as given above. This results in compounds of Formula I wherein Ac' is a protective group. These compounds are then treated for removal of the protective group, as for example by solvolysis, yielding a compound of Formula I wherein Ac' is hydrogen.

The HR₁— group can be in either the cis or trans position as illustrated in the following formulas:

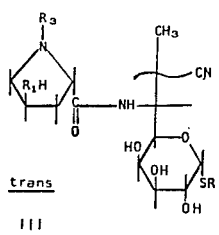
trans
III

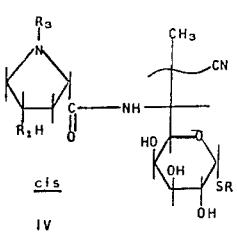
cis
IV
and

If desired, the cis and trans isomers can be separated by counter current distribution or chromatography, either before or ofter replacement of the 7-halo group.

When R₃ in Formula B is hydrogen, it can be replaced by suitable alkylation or like procedure. Advantageously, this replacement is effected by reacting the compound according to Formula I–B, or II–B, wherein R₃ is hydrogen with an oxo compound (an aldehyde or a ketone) and hydrogenating the resulting adduct with a catalyst effective to saturate an olefinic double bond. Either platinum or palladium can be used as the catalyst. Suitable oxo compounds having the formula R₅R₆CO wherein R₅R₆C= is the same as R₂ given above. Examples of suitable oxo compounds are formaldehyde, acetaldehyde, propionaldehyde, butyraldehyde, acetone, isobutylmethyl ketone, benzaldehyde, phenylacetaldehyde, hydrocinnamaldehyde, acetophenone, propiophenone, butyrophenone, 3-methyl-4-phenyl-2-butanone, 2-methyl-5-phenyl-3-pentanone, 3- cyclopentanepropionaldehyde, cyclohexaneacetaldehyde, cycloheptanecarboxaldehyde, 2,2-dimethylcyclopropylacetaldehyde, 2,2-dimethylcyclopropyl methyl ketone, cyclopentyl methyl ketone, cyclobutyl methyl ketone, cyclobutanone, cyclohexanone, 4-methyl-cyclohexanone, and the like.

STARTING MATERIALS

The starting compounds of Formula II are prepared by N-aceylating a compound of the formula:

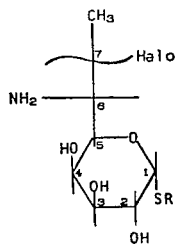
V wherein R is as given above with a 4-substituted-L-2-pyrrolidine-carboxylic acid of Formula A or B.

The starting compounds of Formula V can be prepared by replacing the 7-OH group of a compounud of the formula:

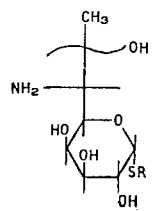
VI by halogen by procedures given below which are not part of this invention.

Alternatively the compounds of Formula II can be prepared by replacing by halogen the 7-hydroxy group of a compound of the formula:

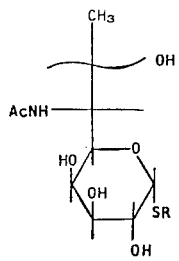
VII to form a compound of the formula:

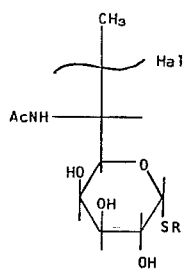
VIII

The starting compounds of Formula VII above can be prepared as described in U.S. Pat. 3,380,992 from starting compounds of Formula VII wherein Ac is a 4-substituted pyrrolidinecarboxylic acid of the formula:

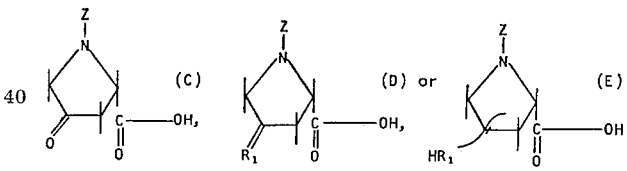

wherein Z is a protective group removable by solvolysis or hydrogenolysis, for example, as described in U.S. Pat. 3,380,992. Any and all of the compounds thus described in U.S. Pat. 3,380,992 can be converted to the corresponding compound of Formula I by the processes of this invention and all such compounds are to be considered as disclosed herein the same as if they had been specifically named.

The starting compound of Formula V and its N-acylate can be prepared by heating a compound of Formula VI or VII with Rydon reagent. The mechanism by which Rydon reagent effects the substitution of the 7-hydroxy by halogen is not fully understood. The mechanism is such that a change in configuration results. Thus, a 7(R)-hydroxy compound of the D-erythro configuration yields a 7(S)-halo compound of the L-threo configuration. For example, 7(S)-chloro-7-deoxylincomycin which is derived from lincomycin (lincomycin has D-erythro configuration), has the L-threo configuration.

Rydon reagents are formed by the addition of halogen to triphenylphosphine or triphenylphosphite or addition of an alkyl halide to triphenylphosphite and can be represented by the formula:

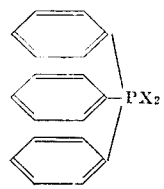
IX

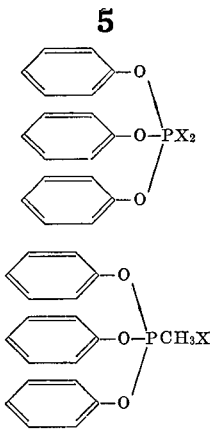

wherein X is halogen, e.g., chlorine, bromine, and iodine. Rydon et al., J. Chem. Soc., 2224 (1953); Ibid, 2281 (1954); Ibid, 3043 (1956). The Rydon reagent can be formed in situ by addition of halogen or methyl halide to a solution of the triphenylphosphine or triphenylphosphite in an inert solvent such as acetonitrile or dimethylformamide, or it can be isolated as a separate entity. In either case the reaction with the lincomycin or related compound is effected by contacting the Rydon reagent therewith in an inert solvent, e.g., acetonitrile or dimethylformamide, until the desired substitution of the 7-hydroxy is obtained. The reaction takes place at ordinary temperature, though gentle heating can be effected if desired. Advantageously the temperature is maintained between about 20° C. and about 55° C. The product can be recovered from the reaction mixture by well-known techniques such as filtration, solvent extraction, etc. The reaction mixture advantageously is treated with methanol to destroy any excess Rydon reagent, filtered to remove any solid such as triphenylphosphine oxide, formed in the reaction, and then treated to recover the product. The methanol can be added either before or after the filtration. Advantageously the treated and filtered reaction mixture is evaporated to dryness and purified by solvent extraction and/or chromatography.

The starting compound of Formula V and its N-acylate can be prepared also by the substitution of the 7-hydroxy with chlorine by the thionyl chloride process. The starting compound of Formula VI or VII, advantageously in the form of an acid-addition salt, e.g., the hydrochloride, is mixed with thionyl chloride, advantageously in the presence of an inert solvent, with mild heating, advantageously at reflux temperature, until the desired substitution of the 7-hydroxy group by chlorine is effected. Advantageously, the reaction is carried out in an inert atmosphere, e.g., under nitrogen. Carbon tetrachloride can be used effectively as the solvent vehicle but other inert solvents such as chloroform, methylene chloride, ethylene chloride, ether, benzene, and the like can be used. A satisfactory procedure is to stir the reaction mixture at room temperature for a considerable period, say from about 1 to 18 hours or as long as necessary to obtain a reasonably clear solution and then to raise the temperature to between about 50 and 100° C., for example, to the reflux temperature (77° C. for carbon tetrachloride). After the reaction is complete, usually after heating at reflux for about 1 to 5 hours, the reaction mixture is allowed to cool, advantageously under nitrogen. Any material that separates on the cooling is collected and dried. The solvent is removed by vacuum distillation at a pot temperature advantageously less than about 35° C. and the material which precipitates is collected and dried and treated with ethanol to convert any residual sulfite intermediates to the desired product. The collected material can then be further purified by solvent extraction and/or recrystallization and can be recovered either as the free base or an acid addition salt.

The proportions of the reagents can be varied widely. Stoichiometrically, however, at least 3 moles of thionyl chloride is required for each mole of starting compound. Any larger amount can be used but ordinarily it is not necessary or desirable to use more than about a 10 fold excess. Advantageously, an excess of about 2 to 4 fold is used. The amount of solvent is not critical and can be varied widely in accordance with the practices in the art. Ordinarily from about 15 to about 30 volumes of solvent for each part of solid starting compound will suffice. The proportion of solvent to thionyl chloride, however, is important because of the solubility of the product in thionyl chloride. If the ratio of solvent to thionyl chloride (v./v.) is high, the desired product precipitates on cooling of the reaction mixture and the workup of the product is simplified. For example, with carbon tetrachloride a mixture of products precipitates directly on cooling the reaction mixture if the v./v. proportion of carbon tetrachloride to thionyl chloride is kept above about 10 to 1.

Substitution of the 7-hydroxy by iodine is effected by a modification of the Rydon reagent process. In this process, the desired halogen substitution is effected simply by mixing the starting compound of Formula VI or VII with triphenylphosphine and carbon tetraiodide in an inert solvent. The reaction takes place at room temperature (25° C.) but gentle heating up to reflux temperature of 50 to 60° C. can be used. Acetonitrile and nitromethane are illustrative solvents. The triphenylphosphine and carbon tetraiodide are optimally used in equimolar proportions and advantageously in a substantial molar excess of the starting compound. Optimally about 4 moles of triphenylphosphine and 4 moles of carbon tetraiodide are used for each mole of starting compound of Formula VI or VII. The process can also be used for effecting chlorination and bromination by substituting carbon tetrachloride or carbon tetrabromide for the carbon tetraiodide.

Any or all of the 2-, 3-, and 4-hydroxy groups can be esterified either before or after the halogenations, for example, with hydrocarbon carboxylic acids, advantageously of not more than 18 carbon atoms, or nitro-, hydroxy-, amino-, cyano-, thiocyano-, or alkoxy substituted hydrocarbon carboxylic acids, advantageously also of not more than 18 carbon atoms.

Example of carboxylic acid acyl radicals are the acyl radicals of the following acids: (a) saturated or unsaturated, straight or branched chain aliphatic carboxylic acids, for example, acetic, propionic, butyric, isobutyric, tert.-butylacetic, valeric, isovaleric, caproic, caprylic, decanoic, dodecanoic, lauric, tridecoic, myristi, pentadecanoic, palmitic, margaric, stearic, acrylic, crotonic, undecylenic, oleic, hexynoic, heptynoic, octynoic acids, and the like; (b) saturated or unsaturated, alicyclic carboxylic acids, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid, and the like; (c) saturated or unsaturated, alicyclic aliphatic carboxylic acids, for example, cyclopentaneacetic acid, cyclopentanepropionic acid, cyclopentaneacetic acid, cyclohexanebutyric acid, methylcyclohexaneacetic acid, and the like; (d) aromatic carboxylic acids, for example, benzoic acid, toluic acid, naphthoic acid, ethylbenzoic acid, isobutylbenzoic acid, methylbutylbenzoic acid, and the like; and (e) aromatic-aliphatic carboxylic acids, for example, phenylacetic acid, phenylpropionic acid, phenylvaleric acid, cinnamic acid, phenylpropiolic acid and naphthylacetic acid, and the like. Suitable nitro-, hydroxy-, amino-, cyano-, thiocyano-, and lower alkoxyhydrocarbon carboxylic acids include hydrocarbon carboxylic acids as given above which are substituted by one or more of nitro, hydroxy, amino, cyano, or thiocyano, containing a total of not more than 18 carbon atoms, or alkoxyhydrocarbon carboxylic acids of not more than 18 carbon atoms. Suitable such alkoxy groups include methoxy, ethoxy, propoxy, butoxy, amyloxy, hexyloxy, dodecyloxy, hexadecyloxy, and isomeric forms thereof. Examples of such substituted hydrocarbon carboxylic acids are mevalonic acid; shikimic acid; 2-nitro-1-methylcyclobutanecarboxylic acid; homogentisic acid; salicylic acid; p-hydroxybenzoic acid; β-resorcylic acid; gallic acid; veratric acid; trimethoxybenzoic acid; trimethoxycinnamic acid; o-, m-, and p-nitrobenzoic acid; cyanoacetic acid; 3,4- and 3,5-dinitrobenzoic acid; 2,4,6-trinitrobenzoic acid; thiocyanoacetic acid; cyanopropionic acid; and lactic acid. Examples of such alkoxyhydrocarbon carboxylic acids are ethoxyformic acid (ethyl hydrogen carbonate); butyloxyformic acid; pentyloxyformic acid; hexyloxyformic acid; dodecyloxyformic acid; hexadecyloxyformic acid; and the like.

Any or all of the 2-, 3-, and 4-hydroxy groups can also be etherified, for example, with alkyl, advantageously of not more than 20 carbon atoms; cycloalkyl, advantageously of from 3 to not more than 12 carbon atoms; or ylidene (e.g., 3,4-O-ylidene) group for example alkylidene, advantageously of not more than 20 carbon atoms and aramethylidene and vinylogs thereof, advantageously of not more than 12 carbon atoms. Examples of alkylidene are given above and examples of aralkylidene are furfurylidene, 5-methylfurfurylidene, benzylidene, m-tolylidene, o-tolylidene, p-tolylidene, p-methoxybenzylidene, m-methoxybenzylidene, o-methoxybenzylidene, 3,4-dimethoxybenzylidene, salicylidene, p - hydroxybenzylidene, 3,4,5-trimethoxybenzylidene, piperonylidene, o-nitrobenzylidene, m-nitrobenzylidene, p-nitrobenzylidene, β-naphthylidene, 3-methoxy - 4 - hydroxybenzylidene, terephthylidene, 3,4-dihydroxybenzylidene, and cinnamylidene.

DETAILED DESCRIPTION

According to one embodiment of the invention a starting compound of Formula II is heated with sodium cyanide in dimethylsulfoxide. Suitable protective groups sometimes result from the process for the preparation of compounds of Formula II as in the case of the esters and ethers referred to above. When free hydroxyl groups are wanted in the 2-, 3-, and 4-positions or a free amino group in the 6-position, a protective group easily removable by acid hydrolysis, for example, trimethylsilyl, is used. The amounts of reagents is not critical, though a substantial excess of sodium cyanide is desirable. Sufficient solvent is used to produce a homogeneous solution. The solution advantageously is heated at about 100° C. for several hours. Higher or lower temperatures, however, can be used but ordinarily it is not necessary or desirable to go below about 25° C. or above 150° C. In place of dimethylsulfoxide there may be used lower dialkylsubstituted sulfoxides and like solvents.

The compounds and intermediates of Formulas I-A and I-B (Formula I where Ac is acyl of acids of Formulas A and B) exist either in the protonated or non-protonated forms according to the pH of the environment. When the protonated form is intended, the compound is qualified as an acid-addition salt and when the non-protonated form is intended it is qualified as the free base. The free bases can be converted to stable acid-addition salts by neutralizing the free base with the appropriate acid to below about pH 7.0, and advantageously to about pH 2 to pH 6. Suitable acids for this purpose include hydrochloric, sulfuric, phosphoric, thiocyanic, fluosilicic, hexafluoroarsenic, hexafluorophosphoric, acetic, succinic, citric, lactic, maleic, fumaric, pamoic, cholic, palmitic, mucic, camphoric glutaric, glycolic, phthalic, tartaric, lauric, stearic, salicylic, 3-phenylsalicylic, 5-phenylsalicylic, 3-methylglutaric, orthosulfobenzoic, cyclopentanepropionic, 1,2 - cyclohexanedicarboxylic, 4 - cyclohexanecarboxylic, octadecenylsuccinic, octenylsuccinic, methanesulfonic, benzenesulfonic, helianthic, Reinecke's, dimethyldithiocarbamic, cyclohexylsulfamic, hexadecylsulfamic, octadecylsulfamic, sorbic, monochloroacetic, undecylenic, 4'-hydroxyazobenzene-4-sulfonic, octyldecylsulfuric, picric, benzoic, cinnamic, and like acids.

The acid-addition salts can be used for the same purposes as the free base or they can be employed to upgrade the same. For example, the free base can be converted to an insoluble salt, such as the picrate, which can be subjected to purification procedures, for example, solvent extractions and washings, chromatography, fractional liquid-liquid extractions, and crystallizations and then used to regenerate the free base form by treatment with alkali or to make a different salt by metathesis. Or the free base can be converted to a water-soluble salt, such as the hydrochloride or sulfate and the aqueous solution of the salt extracted with various water-immiscible solvents before regenerating the free base form by treatment of the thus-extracted acid solution or converted to another salt by metathesis. The free bases of Formulas I-A and I-B can be used as a buffer or as an antacid. The compounds of Formulas I and II react with isocyanates to form urethanes and can be used to modify polyurethane resins. The long chain compounds, i.e., where $HR_2$ is alkyl of from 8 carbon atoms up, have surface active properties and can be used as wetting and emulsifying agents. The thiocyanic acid addition salt when condensed with formaldehyde forms resinous materials useful as pickling inhibitors analogous to those of U.S. Pats. 2,425,320 and 2,606,155. The free bases also make good vehicles for toxic acids. For example, the fluosilicic acid addition salts are useful as mothproofing agents analogous to those of U.S. Pats. 1,915,334 and 2,075,359 and the hexafluoroarsenic acid and hexafluorophosphoric acid addition salts are useful as parasiticides analogous to those of U.S. Pats. 3,122,536 and 3,122,552.

7 - cyano - 7 - deoxylincomycin, and its close analogues, i.e., where $-R_1H$ is cis or trans alkyl of not more than 8 carbon atoms; $R_3$ is hydrogen, methyl, or ethyl; R is alkyl of not more than 8 carbon atoms, have antibacterial properties somewhat inferior to lincomycin but can be used for the same purposes as lincomycin. The other analogues and isomers have similar antibacterial properties but to a lesser degree and can be used for the same purposes as lincomycin where large amounts are not objectionable.

The following examples are illustrative of the process and products of the present invention but are not to be construed as limiting. The parts and percentages are by weight and the solvent ratios are by volume unless otherwise specified.

EXAMPLE 1

7(R) - cyano - 7 - deoxylincomycin [methyl 7 - cyano-6,7,8 - trideoxy - 6 - (trans - 1 - methyl - 4 - propyl - L-2 - pyrrolidinecarboxamido) - 1 - thio - D - erythro - α-D-galacto octopyranoside].

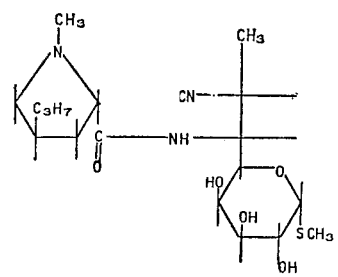

XI

Part A-1: 7(S)-chloro-7-deoxylincomycin and its hydrochloride

A solution of Rydon reagent [J. Chem. Soc., 2224 (1953); ibid., 2281 (1954); ibid., 3043 (1956)] is prepared by stirring a dry solution of 52.6 gm. (0.2 M.) of triphenylphosphine and 800 ml. of acetonitrile at 30° under nitrogen with 13.5 gm. (0.19 M.) of chlorine added over a 20- minute period. After stirring for 10 minutes more, 8.2 gm. of lincomycin is added and the reaction stirred at 30° for 18 hours. A white solid is then present. The reaction is filtered and the solid discarded. Methanol (100 ml.) is added to the filtrate and the solvents then evaporated under vacuum. The viscous residue is dissolved in 100 ml. methanol, diluted with 1800 ml. of water and extracted six times with 200-ml. portions of ether. The ether extracts are discarded, the aqueous phase made basic (pH 11) with aqueous KOH and then extracted four times with 200-ml. portions of methylene chloride. The extracts are dried and evaporated, leaving 11 gm. of a yellow solid which is chromatographed over 1 kg. of silica gel using methanol:chloroform 1:9 (v./v.) as the solvent system. After a forerun of 1200 ml., 22 fractions of 56 ml. are collected. The last 6 (fractions 17–22) are pooled and evaporated to dryness yielding 2.8 gm. of 7(S)-chloro-7-deoxylincomycin. This is converted to the hydrochloride by dissolving in water, adding HCl to pH 1, filtering, and lyophilizing the filtrate.

Part B–1: 2,3,4-tris-o-(trimethylsilyl)ether of 7(S)-chloro-7-deoxylincomycin

Dissolve 40 gm. of 7(S)-chloro-7-deoxylincomycin in 500 ml. of dry pyridine. Silylate by adding 100 ml. of hexamethyldisilazane and 50 ml. of trimethylchlorosilane. Stir the reaction mixture for about 2 hours at about 25° C. Remove the pyridine by evaporation. Dissolve the residue in chloroform. Wash the chloroform solution several times with water and discard the water washes. Filter the chloroform phase through silica gel and evaporate the filtrate to dryness. Yield 52.3 gm. of 2,3,4-tris-o-(trimethylsilyl)ether of 7(S)-chloro-7-deoxylincomycin.

*Analysis.*—Calcd. for $C_{27}H_{57}ClN_2O_5SSi_3$ (percent): C, 50.55; H, 8.94; Cl, 5.53; N, 4.37; S, 5.00. Found (percent): C, 50.20; H, 8.72; Cl, 5.66; N, 4.14; S, 4.46.

Part C–1: 7(R)Cyano-7-deoxylincomycin hydrochloride

A mixture of 2,3,4 - tris(trimethylsilyl) - 7(S) - chloro-7-deoxylincomycin (7.2 g.—0.0112 mole), sodium cyanide (4.0 g.) and dimethylsulfoxide (250 ml.) is heated at 100° C. for 18 hours. The solvent is removed by vacuum distillation and 150 ml. of water added to the residue. Enough 37% HCl is added to bring the aqueous solution to pH 1 and the reaction allowed to stand at 25° C. for 10 minutes in order to cleave the trimethylsilyl groups. The solution is then made basic (pH 11), filtered and the filtrate extracted well with $CHCl_3$. The extracts are evaporated to give 2.8 g. of a dark amber oil. This material is purified via chromatography over silica gel using a solvent system composed of $CHCl_3$:$CH_3OH$ (9:1 volume). The purified material is converted to its hydrochloride salt and recrystallized from ethanol to yield 360 mg.—7% yield—of 7(R)-cyano-7-deoxylincomycin hydrochloride.

*Analysis.*—Calcd. for $C_{19}H_{33}N_3O_5S \cdot HCl$ (percent): C, 50.49; H, 7.58; N, 9.30; S, 7.09; Cl, 7.84. Found (percent): C, 50.86; H, 7.82; N, 8.72; S, 7.06; Cl, 7.80.

Mass spec. mol. wt. (free base) 415. Actual 415. $\alpha_D^{H_2O}$ +124°.

| Antibacterial spectrum: | Mcg./ml.[1] |
|---|---|
| *Staphylococcus aureus* | 0.4–0.8 |
| *Streptococcus hemolyticus* | 0.4 |
| *Streptococcus faecalis* | 0.8 |
| *Bacillus subtilis* | 12.5 |
| Gram negative | >200 |

[1] Two-fold dilution end points in brain-heart infusion broth at 20 hours.

By substituting lincomycin in Example 1 by other alkyl, cycloalkyl, or aralkyl 6,8 - dideoxy - 6 - (trans - 1 - methyl-4 - propyl - L - 2 - pyrrolidinecarboxamido) - 1 - thio - D-erythro - α - D - galactooctopyranosides where alkyl, for example, is ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof; cycloalkyl, for example, is cyclopropyl, cyclobutyl, cyclopentyl, cyclohexyl, cycloheptyl, cyclooctyl, 2-methylcyclopentyl, 2,3-dimethylcyclobutyl, 2 - methylcyclobutyl, and 3 - cyclopentylpropyl; and aralkyl, for example, is benzyl, phenethyl, 3-phenylpropyl, and 1-naphthylmethyl, the corresponding alkyl, cycloalkyl, and aralkyl, 6-acylamino-7-halo - 6,7,8 - trideoxy - 1 - thio - L - threo - α - D - galactooctopyranosides and the corresponding alkyl, cycloalkyl, aralkyl, 6 - acylamino - 7 - cyano - 6,7,8 - trideoxy - 1-thio - D - erythro - α - D - galacto - octopyranosides are obtained. For example, by substituting the lincomycin by ethyl, propyl, butyl, pentyl, and hexyl 6,8-dideoxy-6-acylamino - 1 - thio - D - erythro - α - D - galacto - octopyranosides, the ethyl, propyl, butyl, pentyl, and hexyl 6-acylamino - 7 - halo - 6,7,8 - trideoxy - 1 - thio - L - threo - α-D - galacto - octopyranosides and the ethyl, propyl, butyl, pentyl, and hexyl - 6 - acylamino - 7 - cyano - 6,7,8 - trideoxy - 1 - thio - D - erythro - α - D - galacto - octopyranosides are obtained.

The acylamino groups can be 4-substituted-L-7-pyrrolidinecarboxamido of the formula:

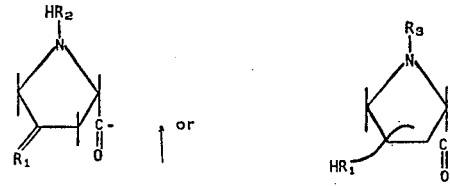

where $R_1$, $R_2$, and $R_3$ are as given above. Advantageously $R_1$ and $R_2$ can be methylene, ethylene, propylene, butylene, pentylene, or hexylene, and $R_3$ can be hydrogen or $HR_2$ in any combinations.

By substituting the lincomycins in the foregoing by 7-epilincomycins, the like compounds in the opposite configuration at the 7-position are obtained.

EXAMPLE 2

Methyl 7(R)-cyano-7-deoxy-α-thiolincosaminide

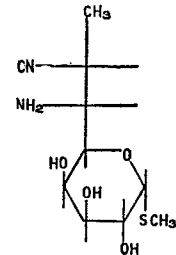

Part A–2: Methyl 7(S)-chloro-7-deoxy-α-thiolincosaminide

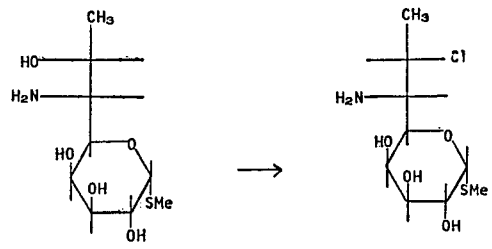

To a suspension of 197.2 g. of triphenylphosphine in 1.5 l. of anhydrous acetonitrile is added 52.5 g. of chlorine. With stirring, 18.75 g. of methyl α-thiolincosaminide (U.S. Pat. 3,179,565) is added. After 2.5 hrs. at ambient temperature, 50 ml. of methanol is added. The mixture is concentrated to a thick syrup. The concentrate is diluted with methylene chloride and extracted three times with water. The aqueous extracts are washed twice with methylene chloride. The extracts are made alkaline with sodium hydroxide and extracted repeatedly with methylene chloride. The organic extract is dried and evaporated under vacuum. The crude product is chromatographed over silica gel using chloroform-methanol (4:1) for elution. The product containing fraction, selected on the basis of its TLC (thin layer chromatography) profile, on recrystallization from methanol-water yields methyl 7(S)-chloro-7-deoxy-α-thiolincosaminide, M.P. 178–181°.

Part B–2: Methyl 2,3,4-O-tris(trimethylsilyl)-N-trimethylsilyl-7(S)-chloro-7-deoxy-α-thiolincosaminide

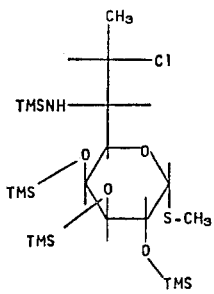

A solution of 27.2 g. (0.1 M) of methyl 7(S)-chloro-7-deoxy-α-thiolincosaminide of Part A–2 and 138 ml. of pyridine is stirred at 25° under nitrogen. Trimethylchlorosilane (24.4 ml.) is added dropwise over a 5 minute period. Hexamethyldisilizane is then added dropwise over a 20 minute period, the pot temperature being kept below 65° C. by use of a cold water bath. The reaction is then stirred for 3 hours at room temperatures. Chloroform (500 ml.) is added and this solution washed 10 times with 100 ml. portions of water. The chloroform phase is evaporated to dryness under vacuum, leaving a viscous, amber oil. The crude product is purified by chromatography over silica gel using a solvent system composed of Skellysolve B (technical hexane):acetone (8:3). Evaporation of the product containing fractions (as determined by thin layer chromatographic analysis) gives the desired product, methyl 2,3,4-tri(trimethylsilyl)-N-trimethylsilyl-7(S)-chloro-7-deoxy - α - thiolincosaminide.

Part C–2: Methyl 7(R)-cyano-7-deoxy-α-thiolincosaminide

The methyl tetrasilyl-7(S)-chloro-7-deoxy-α-thiolincosaminide of Part B–2 (5.6 g.—0.01 mole), sodium cyanide (4 g.), and 200 ml. of dimethylsulfoxide are heated at 100° C. for 18 hours. The solvent is then distilled under vacuum and the residue shaken with 150 ml. of cold 0.1 N HCl for 15 minutes to remove the trimethylsilyl groups. The aqueous solution is extracted well with chloroform and the extracts discarded. The aqueous phase is adjusted to pH 10 with KOH, freeze dried, and the solid residue purified by chromatography over silica gel using a solvent system composed of chloroform:methanol (6:1). Evaporation of the product containing fractions (as determined by thin layer chromatographic analysis) gives the desired product, methyl 7(R)-cyano-7-deoxy-α-thiolincosaminide.

By substituting the methyl 7(S)-chloro-7-deoxy-α-thiolincosaminide by methyl 7(R)-chloro - 7 - deoxy-α-thiolincosaminide, methyl 7(S)-cyano-7-deoxy-α-thiolincosaminide is obtained.

I Claim:
1. A compound of the formula:

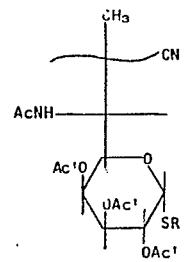

wherein R is alkyl of not more than 20 carbon atoms, cycloalkyl of 3 to not more than 8 carbon atoms, or aralkyl of not more than 12 carbon atoms; Ac' is hydrogen or trimethylsilyl, and Ac is Ac' or an acyl radical of a 4-substituted-L-2-pyrrolidinecarboxylic acid.

2. A compound according to claim 1 in which Ac' is hydrogen and R is lower alkyl.

3. A compound according to claim 1 in which Ac' is trimethylsilyl and R is lower alkyl.

4. A compound according to claim 1 in which R is lower alkyl, Ac' is hydrogen and Ac is an acyl of the formula:

wherein $R_1$ and $R_2$ are alkylidene of not more than 20 carbon atoms, cycloalkylidene of 3 to not more than 8 carbon atoms, or aralkylidene of not more than 12 carbon atoms and $R_3$ is hydrogen or $HR_2$.

5. A compound according to claim 4 in which Ac is 1 - methyl - 4 - propyl-L-2-pyrrolidinecarboxacyl and R is methyl or ethyl.

6. The 7(R) compound according to claim 4 wherein Ac is trans-1-methyl-4-propyl-L-2-pyrrolidinecarboxacyl and R is methyl or ethyl.

7. A compound according to claim 1 in which Ac is Ac' and Ac' is hydrogen.

8. The compound of claim 7 in which R is methyl or ethyl.

9. A process for making a compound of the formula:

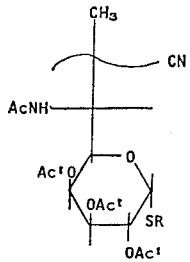

which comprises heating a solution of sodium cyanide and a compound of the formula:

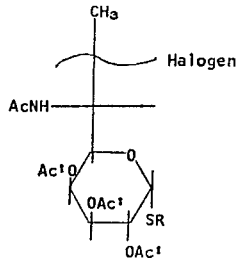

wherein R is the radical of a mercaptan, Ac′ is protective group which can be removed by acid hydrolysis without hydrolysis of the cyano group and Ac is Ac′ or an acyl group of a carboxylic acid, and removing the Ac′ groups by acid hydrolysis without hydrolyzing the cyano group.

10. The process of claim 9 in which R is alkyl of not more than 20 carbon atoms, cycloalkyl of 3 to not more than 8 carbon atoms, or aralkyl of not more than 12 carbon atoms; Ac′ is hydrogen or trimethylsilyl, and Ac is Ac′ or an acyl radical of a 4-substituted-L-2-pyrrolidine-carboxylic acid.

11. The process of claim 9 in which R is lower alkyl, Ac′ is hydrogen and Ac is an acyl of the formula:

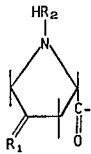 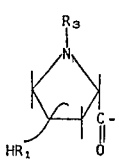

wherein $R_1$ and $R_2$ are alkylidene of not more than 20 carbon atoms, cycloalkylidene of 3 to not more than 8 carbon atoms, or aralkylidene of not more than 12 carbon atoms and $R_3$ is hydrogen or $HR_2$.

12. The process of claim 9 in which Ac′ is trimethylsilyl.

References Cited

UNITED STATES PATENTS 3,418,414   12/1968   Houtman _____ 260—210

OTHER REFERENCES

Noller "Chem. of Organic Compounds," 3rd ed., 1965, W. B. Saunders Co., Philadelphia, Pa. p. 274.

LEWIS GOTTS, Primary Examiner

J. R. BROWN, Assistant Examiner

U.S. Cl. X.R.

252—357; 260—2.5, 999